United States Patent
Sohn et al.

(10) Patent No.: US 9,036,895 B2
(45) Date of Patent: May 19, 2015

(54) METHOD OF INSPECTING WAFER

(71) Applicant: SAMSUNG ELECTRONICS CO., LTD., Suwon-si, Gyeonggi-do (KR)

(72) Inventors: Young-hoon Sohn, Incheon (KR); Yu-sin Yang, Seoul (KR); Sang-kil Lee, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 137 days.

(21) Appl. No.: 13/785,307

(22) Filed: Mar. 5, 2013

(65) Prior Publication Data

US 2013/0301903 A1  Nov. 14, 2013

(30) Foreign Application Priority Data

May 10, 2012 (KR) .......................... 10-2012-0049778

(51) Int. Cl.
G06K 9/00 (2006.01)
G06T 7/00 (2006.01)

(52) U.S. Cl.
CPC .............. *G06T 7/0004* (2013.01); *G06T 7/001* (2013.01); *G06T 2207/10061* (2013.01); *G06T 2207/30148* (2013.01)

(58) Field of Classification Search
USPC ............ 382/141, 145, 147, 149, 152; 348/86, 348/125
See application file for complete search history.

(56) References Cited

U.S. PATENT DOCUMENTS

| | | | |
|---|---|---|---|
| 5,264,912 A | 11/1993 | Vaught et al. | |
| 6,643,017 B2 | 11/2003 | Cohen et al. | |
| 6,728,190 B2 * | 4/2004 | Huang et al. | 720/662 |
| 6,750,974 B2 * | 6/2004 | Svetkoff et al. | 356/602 |
| 7,170,742 B2 * | 1/2007 | Na et al. | 361/679.32 |
| 7,254,822 B2 * | 8/2007 | Chiu | 720/707 |
| 7,404,196 B2 * | 7/2008 | Shirakawa | 720/608 |
| 7,430,750 B2 * | 9/2008 | Lee et al. | 720/648 |
| 7,889,908 B2 * | 2/2011 | Miyamoto et al. | 382/145 |
| 7,920,676 B2 | 4/2011 | Yun et al. | |
| 8,144,968 B2 * | 3/2012 | Vodanovic | 382/141 |
| 8,289,527 B2 * | 10/2012 | Li et al. | 356/601 |
| 8,515,701 B2 * | 8/2013 | Swaringen et al. | 702/85 |
| 8,649,591 B2 * | 2/2014 | Kaneko et al. | 382/149 |
| 2008/0144014 A1 | 6/2008 | Vollrath et al. | |
| 2008/0243412 A1 | 10/2008 | Horie et al. | |
| 2009/0219499 A1 | 9/2009 | Yamaguchi et al. | |
| 2010/0072683 A1 | 3/2010 | Saito et al. | |
| 2011/0272096 A1 | 11/2011 | Serikawa et al. | |

FOREIGN PATENT DOCUMENTS

| | | |
|---|---|---|
| JP | 2010-066186 A | 3/2010 |
| JP | 2010-117161 A | 5/2010 |
| KR | 10-2007-0021832 A | 2/2007 |
| KR | 10-2009-0011596 A | 2/2009 |

* cited by examiner

*Primary Examiner* — Yosef Kassa
(74) *Attorney, Agent, or Firm* — Lee & Morse, P.C.

(57) ABSTRACT

A method of inspecting a wafer includes performing a fabricating process on a wafer, irradiating broadband light on the wafer, such that the light is reflected from the wafer, generating a spectral cube by using the light reflected from the wafer, extracting a spectrum of a desired wafer inspection region from the spectral cube, and inspecting the desired wafer inspection region by analyzing the extracted spectrum.

20 Claims, 11 Drawing Sheets

METHOD OF INSPECTING WAFER

CROSS-REFERENCE TO RELATED APPLICATIONS

The present application claims priority under 35 U.S.C. §119 to Korean Patent Application No. 10-2012-0049778, filed on May 10, 2012, in the Korean Intellectual Property Office, and entitled: "Method Of Inspecting Wafer," which is incorporated by reference herein in its entirety.

BACKGROUND

1. Field

The inventive concept relates to a method of fabricating a semiconductor device, and more particularly, to a method of inspecting a wafer when fabricating a semiconductor device by using the wafer.

2. Description of the Related Art

Semiconductor devices are fabricated by using wafers through hundreds of fabricating processes. Therefore, after performing processes of fabricating each semiconductor device on a wafer, products of fabricating processes have to be inspected or measured rapidly.

SUMMARY

The inventive concept provides a method of inspecting a wafer, which is capable of rapidly inspecting a product of semiconductor fabricating processes.

According to an aspect of the inventive concept, there is provided a method of inspecting a wafer, the method including performing a fabricating process on a wafer, irradiating broadband light on the wafer, such that the light is reflected from the wafer, generating a spectral cube by using the light reflected from the wafer, extracting a spectrum of a desired wafer inspection region from the spectral cube, and inspecting the desired wafer inspection region by analyzing the extracted spectrum.

Irradiating the broadband light nay be performed by using visible light.

Generating the spectral cube may include generating a plurality of spectral images, and generating a spectrum representing variation of reflectivity or phase according to wavelength in each pixel of the spectral images.

Generating the spectral cube may include using light reflected from a wafer inspection region to which the light is irradiated once.

Inspecting the desired wafer inspection region may be performed by setting an area of the wafer inspection region to be smaller than an area of the wafer measurement region.

Extracting the spectral cube may include extracting from the spectral cube a spectrum representing variation of reflectivity or phase according to wavelength in each pixel in the desired wafer inspection region.

Performing the fabricating process may include forming patterns on the wafer, a profile of the patterns or defects of the patterns being examined by the inspecting of the desired wafer inspection region.

Performing the fabricating process may include forming a material layer on the wafer, a thickness or a physical property of the material layer being examined by the inspecting of the desired wafer inspection region.

According to an aspect of the inventive concept, there is also provided a method of inspecting a wafer, the method including performing a fabricating process on a wafer, irradiating broadband light once on a measurement region of the wafer, such that the light is reflected from the wafer, generating a spectral cube by using the light reflected from the measurement region of the wafer, storing the spectral cube in a computer, extracting from the spectral cube a spectrum of a desired wafer inspection region of a product of the fabricating process by using the computer in which the spectral cube is stored, and inspecting the desired wafer inspection region by analyzing the spectrum extracted by the computer.

Generating and storing the spectral cube in the computer may include making the light reflected from the wafer measurement region incident on a spectral imaging camera, generating a spectrum representing variation of reflectivity or phase in each pixel via an optical sensor in the spectral imaging camera, and storing the spectral cube representing the variation of the reflectivity or the phase according to wavelength in each of the pixels in the computer.

The method may further include selecting the desired wafer inspection region in the spectral cube by using the computer in which the spectral cube is stored, before extracting the spectrum of the wafer inspection region.

Analyzing the extracted spectrum may be performed by using a spectrum analyzer including a spectrum recognition algorithm.

Inspecting the result of the fabricating process on the wafer inspection region may be performed by comparing a spectrum of the wafer inspection region, which is predetermined in the spectrum recognition algorithm, and the extracted spectrum of the wafer inspection region.

Fabricating process may include forming a pattern on the wafer or forming a material layer on the wafer.

Inspecting the result of the fabricating process may include checking a profile or defects of the pattern, or a thickness or a physical property of the material layer.

According to an aspect of the inventive concept, there is also provided a method of inspecting a wafer, the method including performing a fabricating process on a wafer, irradiating light on a desired wafer inspection region of a product of the fabricating process, such that the light irradiates simultaneously the entire desired wafer inspection region, generating a spectral cube by using light reflected from the desired wafer inspection region, extracting from the spectral cube a spectrum of at least a portion of the desired wafer inspection region, and inspecting the desired wafer inspection region by analyzing the extracted spectrum.

Irradiating light on the desired wafer inspection region may include using a single imaging operation to irradiate the entire desired wafer inspection region.

Irradiating simultaneously the entire desired wafer inspection region may include adjusting the light to be incident simultaneously on multiple points, such that each image in the spectral cube includes a plurality of pixels.

Irradiating simultaneously the entire desired wafer inspection region may include adjusting a light source irradiating the light to be stationary, such that an incidence angle of the light on the desired wafer inspection region is constant until generation of the spectral cube is complete.

Generating the spectral cube may include generating a plurality of images, each image of the plurality of images being an image of the same entire desired wafer inspection region.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
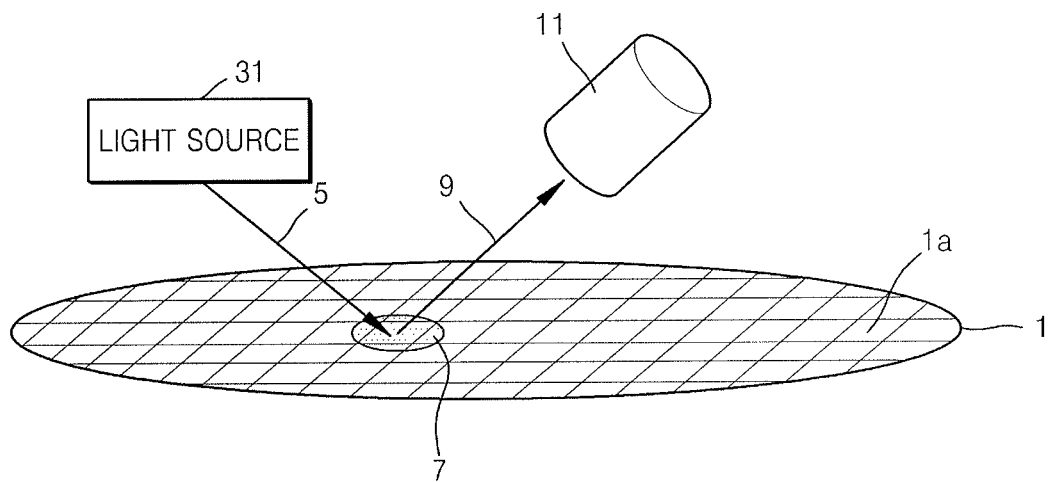
FIG. 1 illustrates a diagram of a method of inspecting a wafer, according to an embodiment of the present inventive concept.

Example embodiments will now be described more fully with reference to the accompanying drawings; however, they may be embodied in many different forms and should not be construed as being limited to the embodiments set forth herein. Rather, these embodiments are provided so that this disclosure will be thorough and complete, and will fully convey exemplary implementations to those skilled in the art. As the example embodiments allow for various changes and numerous embodiments, particular embodiments will be illustrated in the drawings and described in detail in the written description. However, this is not intended to limit the example embodiments to particular modes of practice, and it is to be appreciated that all changes, equivalents, and substitutes that do not depart from the spirit and technical scope of the inventive concept. In the description of the example embodiments, certain detailed explanations of related art are omitted when it is deemed that they may unnecessarily obscure the essence of the inventive concept.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
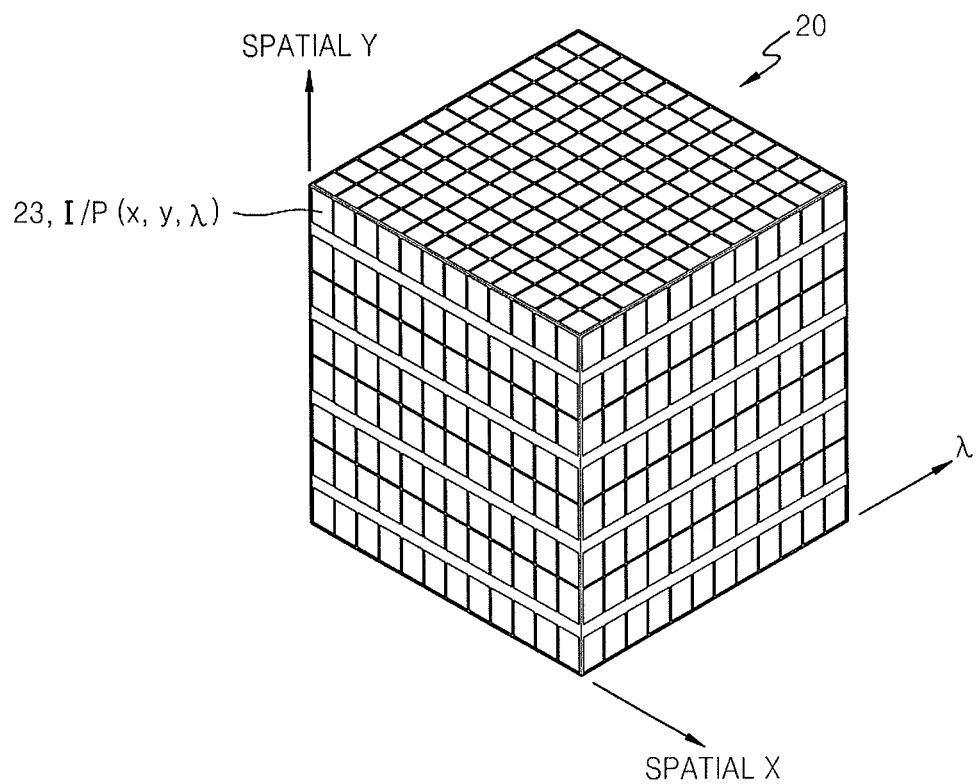
FIG. 2 illustrates a diagram of a spectral cube in a wafer measurement region of FIG. 1.
Figure 3A:
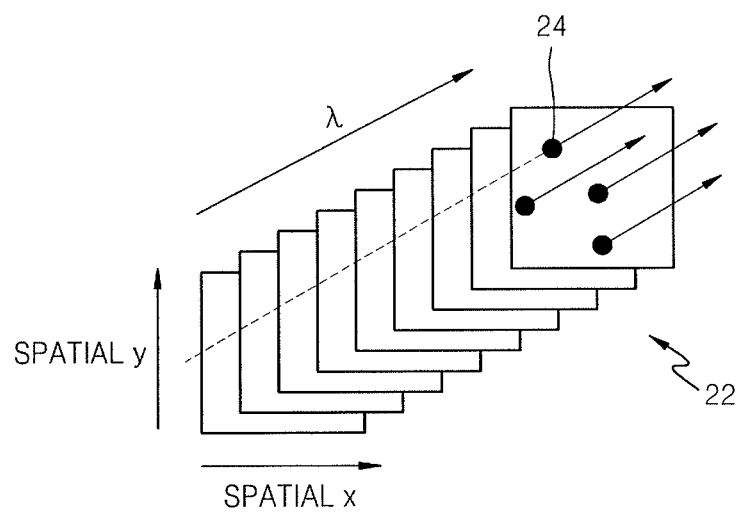
FIG. 3A illustrates a diagram of a part of the spectral cube shown in FIG. 2.
Figure 3B:
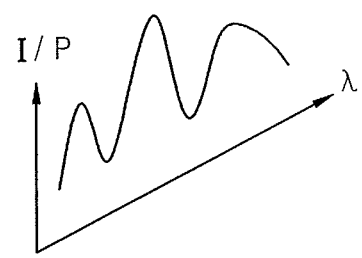
FIG. 3B illustrates a diagram of a spectrum according to one pixel in the partial spectral cube shown in FIG. 3A.

FIG. 1 is a diagram illustrating a method of inspecting a wafer, according to an embodiment of the present inventive concept, FIG. 2 is a diagram showing a spectral cube in a wafer measurement region 7 of FIG. 1, FIG. 3A is a diagram showing a part of the spectral cube shown in FIG. 2, and FIG. 3B is a diagram showing a spectrum according to one pixel in the partial spectral cube shown in FIG. 3A.

In more detail, the method of inspecting a wafer, according to an embodiment of the present inventive concept, includes inspecting a wafer 1 by using a spectral image sensing method. First, a light source 31 irradiates light 5 onto a measurement region 7 of the wafer 1, e.g., the light 5 simultaneously irradiates the entire measurement region 7 of the wafer 1. On the wafer 1, a plurality of regions, e.g., chip regions 1a, may be formed through semiconductor fabricating processes. The measurement region 7 may be one chip region 1a or a plurality of chip regions 1a according to a light irradiation range.

The light 5 irradiated on the wafer 1 is reflected by the measurement region 7 on the wafer 1, and a reflected light beam 9 is incident on a spectral imaging camera 11 to obtain a spectral cube 20 shown in FIG. 2. The spectral cube 20 is image data obtained via the spectral imaging camera 11. The spectral cube 20 denotes a virtual spectral data structure obtained through a re-sampling process of pixels in a spatial area and a spectral area. That is, irradiation/reflection of the light with respect to the measurement region 7 of the wafer 1 may be repeated multiple times, i.e., while each single irradiation simultaneously covers the entire measurement region 7 of the wafer 1, to collect multiple images of a same region into the spectral cube 20. The spectral cube 20 may be referred to as an image cube.

As shown in FIGS. 2, 3A, and 3B, the spectral cube 20 includes spatial axes, i.e., spatial axis X and spatial axis Y, and a plurality of collected images, i.e., spectral images 22 (FIG. 3A), with respect to a wavelength λ. That is, each image in the plurality of spectral images 22 may include a length coordinate, a width coordinate, and a corresponding wavelength, e.g., emission or excitation, so the plurality of spectral images 22 may define a three-dimensional matrix.

Referring to FIG. 2, part 23 of the spectral cube 20 may refer to a wafer inspection region included in the wafer measurement region 7. The part 23 of FIG. 2 may be defined by a coordinate I(x, y, λ). The spectral image 22 may be referred to as a spectral domain, and each pixel 24 in a spectral image 22 includes a spatial location (x/y coordinate), as illustrated in FIG. 3A.

The spectral cube 20 includes the spectral images 22 having spatial coordinates of the pixels 24 photographed by a field of view (FOV) of an optical sensor (not shown) in the spectral imaging camera 11, and spectra characterizing the pixels 24 of the spectral images 22 according to wavelengths. That is, as shown in FIGS. 3A and 3B, the spectral cube 20 includes a plurality of spectral images 22 and spectra showing reflectivity or phase variation depending on the wavelength in each of the pixels 24 of the spectral images 22. FIG. 3B shows a spectrum representing the reflectivity or the phase variation of one pixel in the spectral images 22 according to the wavelength of the reflected light 9, as denoted by an arrow of FIG. 3A. In FIGS. 3A and 3B, I/P denotes an intensity of the reflected light 9 or the phase variation.

As described above, according to the method of inspecting the wafer of the present embodiment, the spectrum representing the reflectivity or the phase variation according to the wavelength in each of the pixels 24 of the spectral images 22 included in the spectral cube 20 is analyzed, thereby rapidly inspecting the wafer 1. In other words, as the wafer inspection method according to example embodiments includes obtaining the spectral cube 20, where images of desired measuring region and spectra of independent pixels may be obtained by a single imaging operation, the inspection time of the wafer 1 may be substantially reduced.

Figure 4:
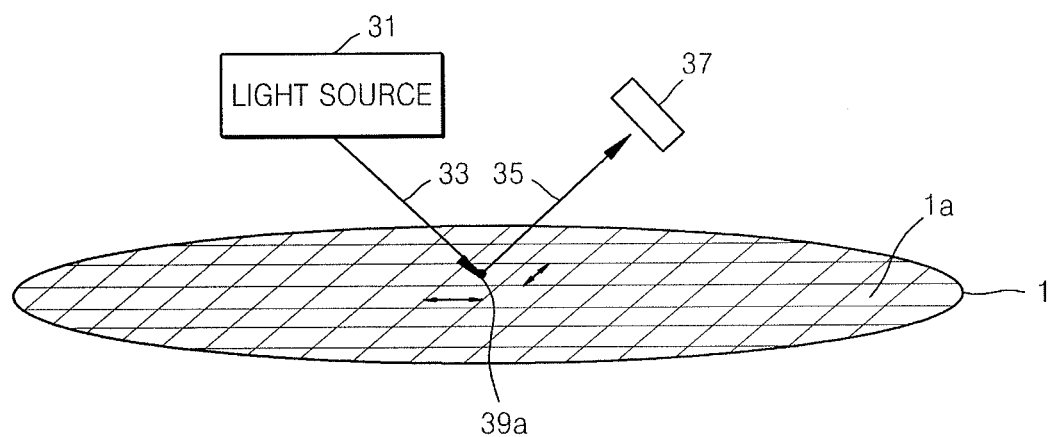
FIG. 4 illustrates a diagram of a method of inspecting a wafer, according to a comparative example.
Figure 5:
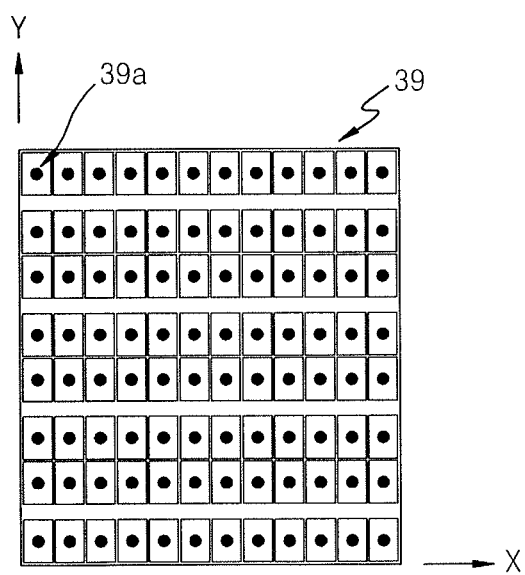
FIG. 5 illustrates a diagram of a measurement region of the wafer in FIG. 4.
Figure 6:
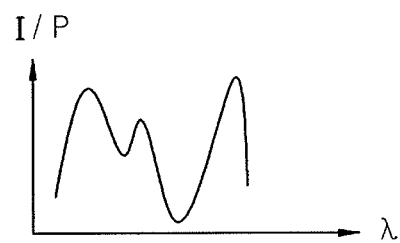
FIG. 6 illustrates a diagram of a spectrum according to measuring points of FIG. 4.

FIG. 4 is a diagram illustrating a method of inspecting a wafer 1, according to a comparative example, FIG. 5 is a diagram showing a measurement region of the wafer 1 shown in FIG. 4, and FIG. 6 is a diagram showing a spectrum according to measuring points 39a of FIG. 4.

In more detail, according to a comparative example, when the wafer 1 is inspected by using a point spectrum, rather than the spectral cube 20, the light source 31 sequentially irradiates light 33 onto a plurality of measuring points 39a on the wafer 1, e.g., one measuring point 39a may be a part of the chip region 1a on the wafer 1. That is, in order to irradiate an entire measuring region 39 (FIG. 5), the light source 31 sequentially irradiates each measuring point 39a in the measuring region 39.

The light 33 irradiated on the wafer 1 is reflected by the measuring points 39a on the wafer 1, and the reflected light 35 from each single measuring points 39a is incident onto a single diode 37. Accordingly, the spectrum shown in FIG. 6 may be obtained. The spectrum may represent the reflectivity or the phase variation of the reflected light 35 according to the wavelength. In FIG. 6, I/P denotes an intensity or phase variation of the reflected light 35.

According to the method of inspecting the wafer of the comparative example, in order to inspect the measurement region 39 of the wafer 1 in FIG. 4, the measuring point 39a has to be moved in a direction denoted by the arrow of FIG. 4 so that the light 33 may be irradiated to all of the measuring points 39a. That is, according to the method of the comparative example, the spectrums of the measurement region 39 are obtained while moving the plurality of measuring points 39a, and the spectrums are analyzed to inspect the wafer 1.

The method of the present embodiment and the method according to the comparative example are compared with each other as follows. According to the method of inspecting the wafer of the comparative example (FIGS. 4-6), the spectrum is measured for each of the measuring points 39a to inspect the surface of the wafer 1. Therefore, in order to obtain the spectra of the desired measurement region 39, the light has to be separately irradiated onto each of the measuring points 39a while moving between the measuring points 39a, thereby requiring a long time to inspect the wafer 1.

In contrast, according to the method of inspecting the wafer of the present embodiment (FIGS. 1-3), an image of the desired measurement region 7 and independent spectrums of all pixels 24 may be obtained simultaneously by a single photographing operation, as described above, thereby substantially reducing the time required to inspect the wafer 1. A resolution of the image and the measurement time may be determined based on a pixel resolution and an optical system configuration of the spectral imaging camera 11.

For example, it may take one minute or less to generate the spectral cube 20 by using the spectral imaging camera 11 having a resolution of one million pixels. Therefore, according to the method of inspecting the wafer 1 of the present embodiment, an inspection speed may increase by tens or hundreds times as compared to the method of inspecting the wafer 1 according to the comparative example, in consideration of data processing time.

Further, in the method of inspecting the wafer 1 according to the comparative example (FIGS. 4-6), a limited number of spectra are obtained. However, the method of inspecting the wafer of the present embodiment may obtain as many spectra as the number of pixels, thereby increasing the inspection efficiency by hundreds of times in view of resolution, even when an average value of a predetermined pixel area is calculated.

Also, since the method of inspecting the wafer according to the comparative example (FIGS. 4-6) is a method of measuring each of the measuring points 39a, a pattern recognition operation is performed every time by using an additional optical device for reaching the measuring point 39a exactly. That is, according to the wafer inspection method of the comparative example, light has to be irradiated onto an exact portion of the wafer 1 (including a cell region and a peripheral circuit region), thereby requiring a pattern recognition operation. Therefore, an additional time may be required, and a measuring error may be generated (if the pattern recognition performed by the hardware fails).

In contrast, according to the method of inspecting the wafer of the present embodiment (FIGS. 1-3), the spectral cube 20 is generated based on the image of the measurement region 7, and the spectrum of a desired wafer inspection region 23 is arbitrarily extracted by using the generated spectral cube 20. Accordingly, the pattern matching process by using hardware is not necessary. In addition, according to the method of inspecting the wafer of the present embodiment, the spectrum of the desired wafer inspection region 23 may be freely extracted from the spectral cube 20 that is stored after being measured, so there is no need to perform the inspection again even when the wafer inspection region 23 is changed.

Figure 7:
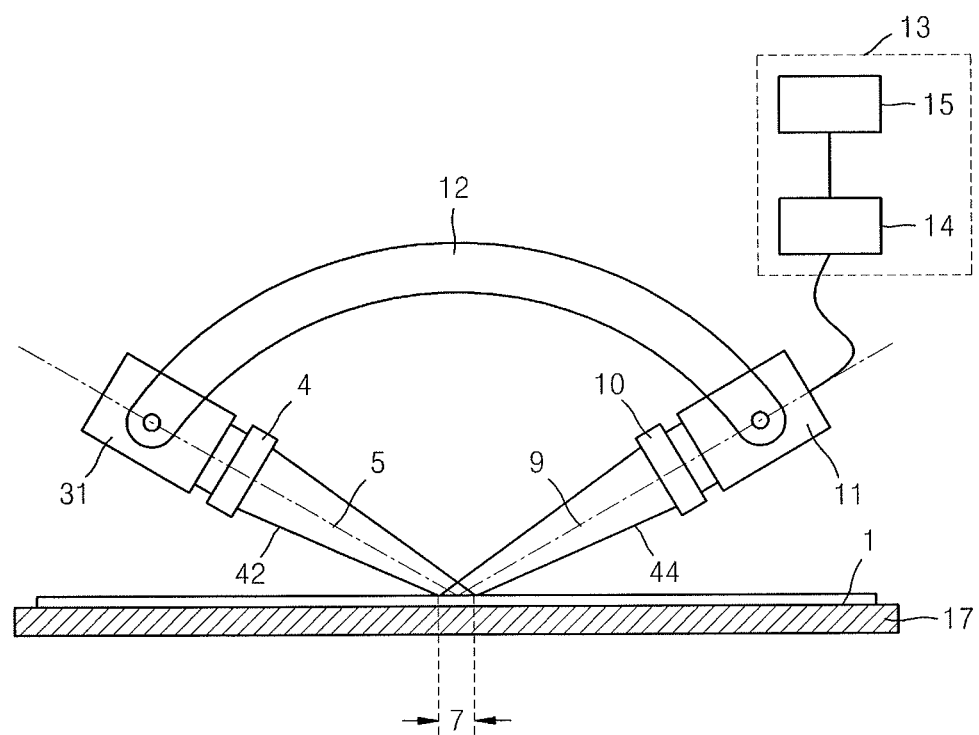
FIG. 7 illustrates a diagram of a wafer inspection device using the wafer inspection method, according to an embodiment of the present inventive concept.

FIG. 7 is a diagram of a wafer inspection device used to execute the method of inspecting the wafer 1, according to an embodiment of the present inventive concept.

Referring to FIG. 7, the light source 31 and a first side optical element 4 may be attached to define an incidence body 42 of the wafer inspection device. The light source 31 irradiates broadband light, e.g., visible light. The visible light may have a wavelength ranging from about 400 nm to about 800 nm.

The first side optical element 4, e.g., a lens or a polarizer, may be attached to the light source 31. Light 5 emitted from the light source 31, i.e., incident light 5, is irradiated through the first side optical element 4 onto the measurement region 7 on the wafer 1 that is placed on a stage 17. The wavelength band of the light source 31 is related to the spectral imaging camera 11. The light source 31 may use various ranges of wavelength bands since sensitivity with respect to the measurement regions 7 on the wafer 1 varies depending on each of the wavelength bands of the light source 31.

A second side optical element 10 and the spectral imaging camera 11 may be attached to define an exit body 44 of the wafer inspection device. The reflected light 9 from the wafer 1 is incident on the spectral imaging camera 11 via the second side optical element 10, e.g., a lens or a polarizer. An angle adjuster 12 may be installed between the incidence body 42 and the exit body 44, and may adjust an angle with respect to the sensitivity of the measurement region 7 by adjusting an incident angle of the incident light 5 and/or a reflection angle of the reflected light 9.

The spectral imaging camera 11 may be connected to a processor, e.g., a computer 13. The spectral imaging camera 11 may generate the spectral cube 20 by using the reflected light 9 from the measurement region 7 on the wafer 1, and may store the spectral cube 20 in a storage unit 14 of the computer 13.

The storage unit 14 of the computer 13 may be connected to a spectrum analyzer 15 including a spectrum recognition algorithm. Accordingly, a spectrum of a desired region in the measurement region 7 may be extracted from the spectral cube 20 stored in the storage unit 14 of the computer 13. In FIG. 7, the spectrum analyzer 15 is included in the computer 13; however, the spectrum analyzer 15 may be separately disposed from the computer 13.

The spectrum analyzer 15 may be an optical critical dimension (OCD) gauge including a spectrum recognition algorithm. The OCD gauge may extract physical parameters of the wafer inspection region from the spectrum data. The spectrum recognition algorithm of the OCD gauge may be a rigorous coupled-wave analysis (RCWA) algorithm. The RCWA algorithm may be used to illustrate diffraction or reflection of electromagnetic waves from a grating-structured surface. Therefore, the result of the wafer inspection region 23 may be inspected with the spectrum extracted by the computer 13 by using the spectrum analyzer 15.

Figure 8:
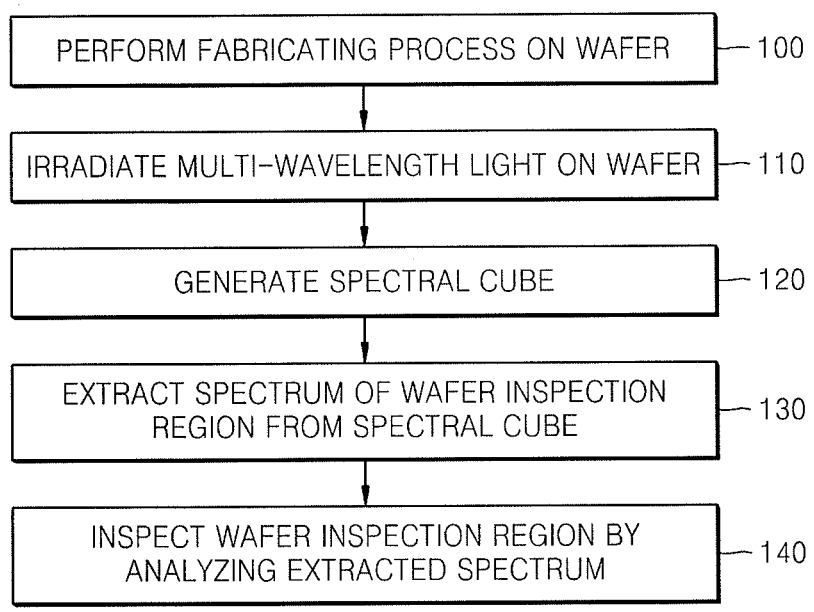
FIG. 8 illustrates a flowchart of a method of inspecting a wafer, according to an embodiment of the present inventive concept.

FIG. 8 is a flowchart illustrating a method of inspecting a wafer, according to an embodiment of the present inventive concept.

Referring to FIGS. 1-3 and 7-8, a fabricating process may be performed on the wafer 1 (operation S100). For example, the fabricating process may be a process for forming patterns on the wafer 1 or a process for forming a material layer on the wafer 1.

Next, in operation S110, the broadband light 5 is irradiated on the wafer 1 on which the fabricating process is performed by using the light source 31, e.g., an LED light source. The broadband light 5 may be visible light. The wavelength range of the visible light may be from about 400 nm to about 800 nm.

Next, the spectral cube 20 is generated by the reflected light 9 that is reflected from the wafer 1 (operation S120). The spectral cube 20 is generated by the spectral imaging camera 11 by using the reflected light 9 from the wafer 1. The spectral cube 20 includes a plurality of spectral images 22, and spectra representing the reflectivity or the phase variation according to the wavelength in each of the pixels 24 of the spectral images 22. The spectral cube 20 is data corresponding to the measurement region 7, i.e., to which the light 5 is simultaneously irradiated only once to cover the entire measurement region 7.

Next, the spectrum of the desired wafer inspection region 23 is extracted from the spectral cube 20 (operation S130). When extracting the spectrum, an area of the wafer inspection region 23 may be less than that of the wafer measurement region 7. The process of extracting the spectrum is performed by using software after the measurement by using the measured image, i.e., the spectral cube 20. Therefore, the spectrum of the desired wafer inspection region 23 may be extracted if there is the spectral cube 20 of an FOV without performing an additional measuring operation. In addition, if the fabricating process is a pattern forming process, there is no need to perform the pattern matching operation using hardware, unlike the comparative example, when extracting the spectrum as described above. Accordingly, a loss of time and a re-measuring operation caused by the measurement error may be reduced.

Finally, the wafer inspection region 23 is inspected by analyzing the extracted spectrum (operation S140). The analyzing of the extracted spectrum may be performed by the spectrum analyzer 15 including the spectrum recognition algorithm as described above. The analyzing of the extracted spectrum may be performed by using the OCD gauge including the spectrum recognition algorithm, and the spectrum recognition algorithm of the OCD gauge may be the RCWA algorithm, as described above.

For example, the spectrum recognition algorithm included in the spectrum analyzer 15 may include the spectrum corresponding to a predetermined pattern profile of the wafer inspection region, i.e., the critical dimension or a height of the pattern, or the spectrum corresponding to various material layers. Therefore, the predetermined spectrum with respect to the wafer inspection region 23 and the extracted spectrum of the wafer inspection region 23 are compared with each other. Then, a relational function is derived to numerically verify the fabricating processing product on the wafer inspection region 23.

If the fabricating process is the process for forming the pattern on the wafer 1, the extracted spectrum is analyzed to check the pattern profile or defects. The pattern profile may be the critical dimension of the pattern or the height of the pattern. When the fabricating process is the process for forming the material layer on the wafer 1, the extracted spectrum is analyzed to check a thickness or physical properties of the material layer.

Figure 9A:
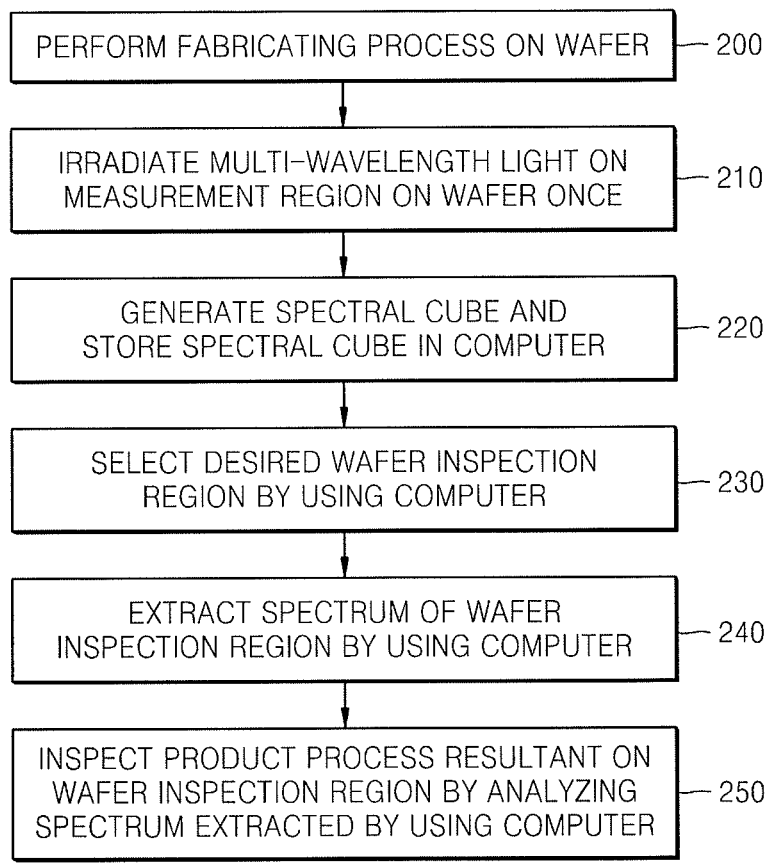
FIGS. 9A and 9B illustrate flowcharts of a method of inspecting a wafer, according to other embodiments of the present inventive concept.
Figure 9B:
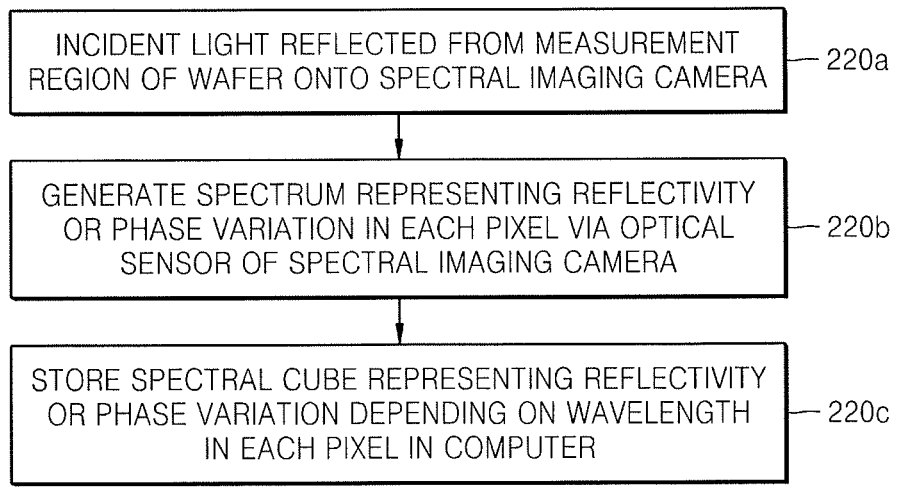

FIGS. 9A and 9B are flowcharts illustrating a method of inspecting a wafer, according to another embodiments of the present inventive concept.

Referring to FIGS. 1-3, 7, and 9A-9B, a fabricating process is performed on the wafer 1 (operation S200). Operation S200 corresponds to operation S100 shown in FIG. 8, and thus, detailed descriptions thereof are not provided.

Next, the broadband light 5 is irradiated on the measurement region 7 on the wafer 1, on which the fabricating process is performed, by using the light source 31 (operation S210). Operation S210 corresponds to operation S110 shown in FIG. 8, and thus detailed descriptions thereof are not provided.

Next, the spectral cube 20 is generated by using the reflected light 9 from the wafer 1, and the generated spectral cube 20 is stored in the storage unit 14 of the computer 13 (operation S220). That is, the spectral imaging camera 11 generates the spectral cube 20 by using the reflected light 9 from the measurement region 7 of the wafer 1, and then, stores the spectral cube 20 in the storage unit 14 of the computer 13. The spectral cube 20 is described above, and thus, detailed descriptions thereof are not provided.

The process of generating the spectral cube 20 and storing the spectral cube 20 in the computer 13 may include three sub-processes as shown in FIG. 9B. That is, the reflected light 9 reflected from the measurement region 7 of the wafer 1 is incident onto the spectral imaging camera 11 (operation S220a). Then, the spectrum representing the reflectivity or the phase variation in each of the pixels is generated by using the optical sensor of the spectral imaging camera 11 (operation S220b). Finally, the spectral cube 20 representing the reflectivity or the phase variation in each of the pixels according to the wavelength is stored in the computer 13 (operation S220c).

If necessary, the desired wafer inspection region 23 is selected from the spectral cube 20 by using the computer 13 in which the spectral cube 20 is stored (operation S230). The spectrum of the desired wafer inspection region 23 is extracted from the spectral cube 20 (operation S240). Operation S240 corresponds to the operation S130 shown in FIG. 8, and thus, detailed descriptions thereof are not provided.

The extracted spectrum is analyzed to inspect the wafer inspection region (operation S250). The operations S250 corresponds to the operation S140 of FIG. 8, and thus, detailed descriptions thereof are not provided.

Figure 10A:
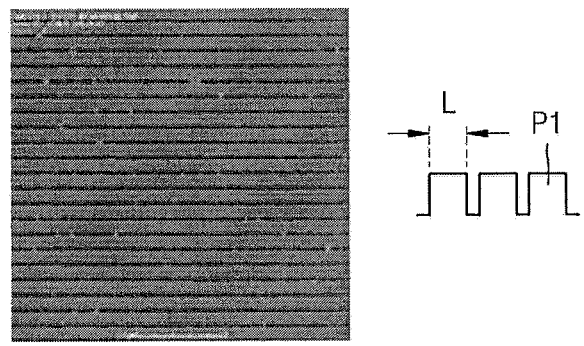
FIGS. 10A through 10C illustrate diagrams of a wafer used in the method of inspecting wafers according to the embodiment of the present inventive concept.
Figure 10B:
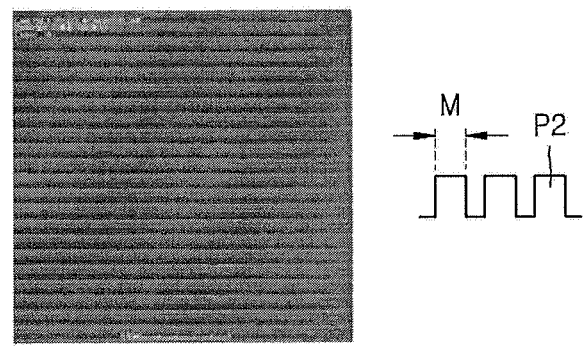
Figure 10C:
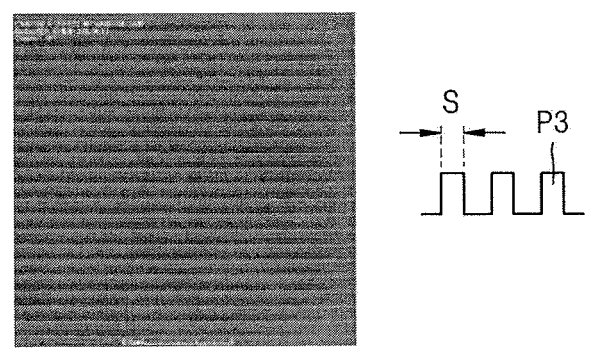

Hereinafter, results of verifying the method of inspecting the wafer, according to the embodiment of the present inventive concept, by using a wafer on which various patterns are formed will be described with reference to FIGS. 10A-10C. FIGS. 10A through 10C are diagrams illustrating a wafer used in the method of inspecting the wafer according to the embodiment of the present inventive concept.

Referring to FIGS. 10A through 10C, various patterns P1, P2, and P3 may be formed on one wafer that is to be used in the method of inspecting the wafer according to the embodiment of the present inventive concept. For example, line-and-space patterns P1, P2, and P3 may be formed on the wafer 1 of photoresist. In addition, the patterns P1, P2, and P3 have the same pitches as each other and different critical dimensions (CDs), i.e., line widths, from each other.

FIGS. 10A through 10C are photographs of the patterns P1, P2, and P3 formed on the wafer 1 that are obtained by using a scanning e-beam microscope (SEM). FIG. 10A shows the pattern P1 having a large CD (L), i.e., a large line width, FIG. 10B shows the pattern P2 having an intermediate CD (M), i.e., an intermediate line width, and FIG. 10C shows the pattern P3 having a small CD (S), i.e., a small line width.

Figure 11A:
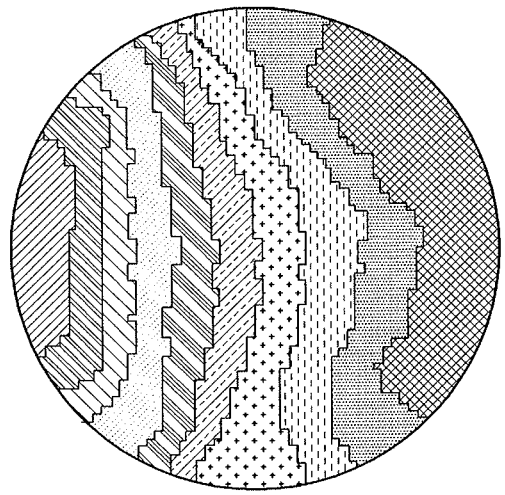
FIGS. 11A through 13B illustrate diagrams of threshold values measured by the method of inspecting the wafers according to the present inventive concept to be compared with threshold values measured by the method according to the comparative example.
Figure 11B:
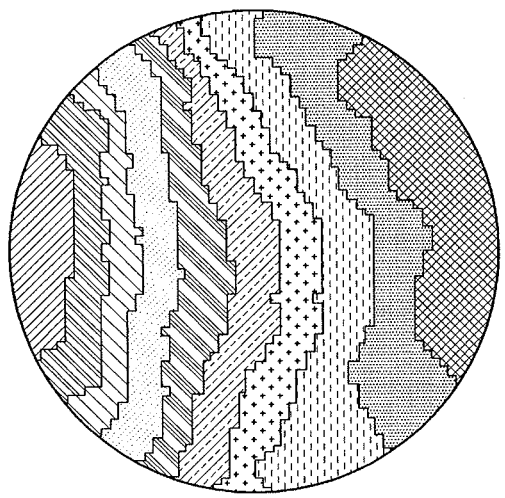
Figure 12A:
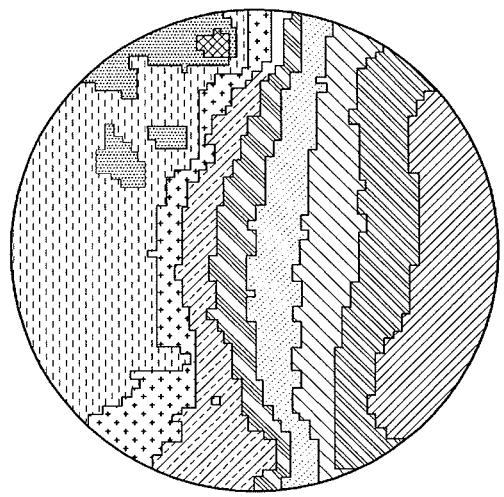
Figure 12B:
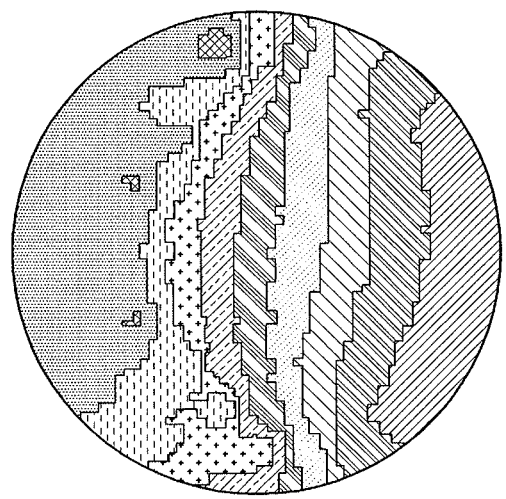
Figure 13A:
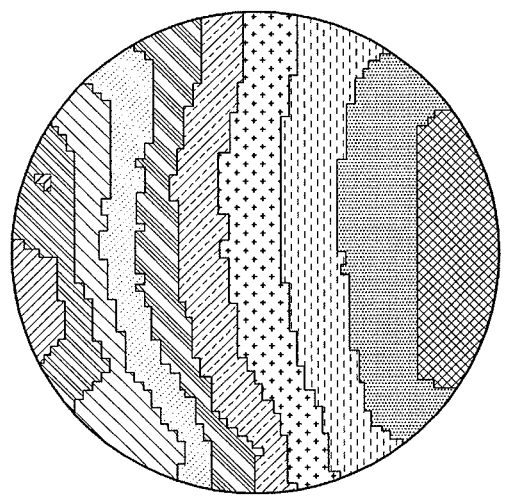
Figure 13B:
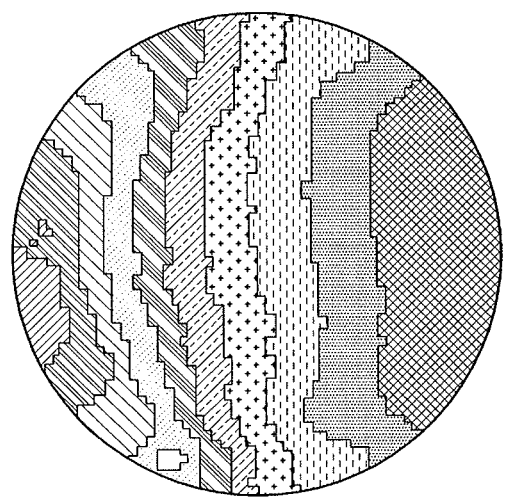

FIGS. 11A through 13B are diagrams showing the CDs measured by the method of inspecting the wafer according to the embodiment of the present inventive concept and the CDs measured by the method of inspecting the wafer according to the comparative example. In more detail, FIGS. 11A through 13B are diagrams for comparing the CDs measured by the method according to the embodiment of the present inventive concept with the CDs measured by the method according to the comparative example, by using the wafer shown in FIGS. 10A through 10C. FIGS. 11B, 12B, and 13B show the CDs measured by the method of inspecting the wafer according to the embodiment of the present inventive concept, and FIGS. 11A, 12A, and 13A show the CDs measured by the method of inspecting the wafer according to the comparative example.

FIGS. 11A and 11B show the results of measuring the patterns, i.e., a difference between the CDs of about 8 nm. FIGS. 12A and 12B show the results of measuring the patterns, i.e., a difference between the CDs of about 37 nm represented on the wafer. FIGS. 13A and 13B show the results of measuring the patterns, i.e., a difference between the CDs of about 28 nm, represented on the wafer. In FIGS. 11A through 13B, right sides show the CD values of the regions on the wafer 1.

When comparing FIGS. 11A and 11B, FIGS. 12A and 12B, and FIGS. 13A and 13B with each other, the CDs measured by the method according to the method of the present inventive concept and the CDs measured by the method according to the comparative example are rarely different from each other, and the correlation is about 99%. Therefore, the method of inspecting the wafer according to the embodiment of the present inventive concept may sufficiently replace the method of the inspecting the wafer according to the comparative example.

Figure 14A:
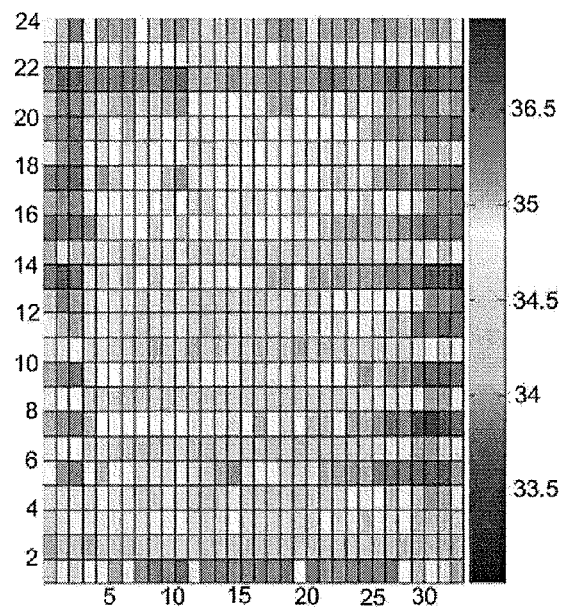
FIGS. 14A and 14B illustrate diagrams showing uniformity of the threshold values measured by the method of inspecting wafer according to the embodiment of the present inventive concept and uniformity of the threshold values measured by the method according to the comparative example to be compared with each other.
Figure 14B:
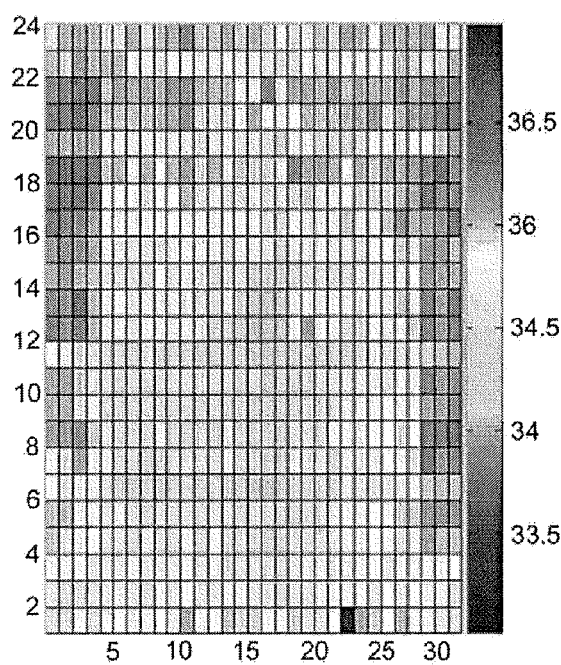

FIGS. 14A and 14B are diagrams for comparing uniformity of the CD values measured by the method of inspecting the wafer according to the embodiment of the present inventive concept with uniformity of the CD values measured by the method of inspecting the wafer according to the comparative example.

In more detail, FIGS. 14A and 14B show the uniformities of the CDs on a certain region by using the wafer shown in FIGS. 10A through 10C. In FIGS. 14A and 14B, values on right sides denote CDs.

FIG. 14A shows the CD values measured by the method of inspecting the wafer according to the comparative example shown in FIGS. 4-5. According to the method in FIG. 14A, it takes about 90 minutes to measure a wafer based on about 1000 measuring points. [size]

FIG. 14B shows the CD values measured by the method of inspecting the wafer according to the embodiment of the present inventive concept. In FIG. 14B, the measurement region is about 32 mm×24 mm in order to obtain a spectral cube of a predetermined size, the effective measuring points, i.e., the number of pixels, is 760×860, and a resolution of the spectrum is 10 nm. According to the method in FIG. 14B, it takes about 40 seconds to obtain the spectral cube of the measurement region. As the spectrum of the wafer inspection region is extracted from the spectral cube and includes a calculation process performed after obtaining the spectral cube, an additional measuring time is not necessary.

When comparing FIGS. 14A and 14B with each other, the uniformity of the CD values measured by the method according to the present embodiment and the uniformity of the CD values measured by the method according to the comparative example are substantially the same, i.e., not much different from each other. However, as the length of measurements according to example embodiments may be performed tens to hundreds of times faster than in the comparative example, the method of the present embodiment is more efficient that the method of the comparative example.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A method of inspecting a wafer, the method comprising:
    performing a fabricating process on a wafer;
    irradiating broadband light on the wafer, such that the light is reflected from the wafer;
    generating a spectral cube using the light reflected from the wafer;
    extracting a spectrum of a desired wafer inspection region from the spectral cube; and
    inspecting the desired wafer inspection region by analyzing the extracted spectrum using a spectrum of the desired wafer inspection region, which is included in a spectrum recognition algorithm.

2. The method as claimed in claim 1, wherein the broadband light is visible light.

3. The method as claimed in claim 1, wherein generating the spectral cube includes:

generating a plurality of spectral images; and
generating a spectrum representing variation of reflectivity or phase according to wavelength in each pixel of the spectral images.

4. The method as claimed in claim 1, wherein generating the spectral cube includes using light reflected from a wafer inspection region to which the light is irradiated once.

5. The method as claimed in claim 4, wherein inspecting the desired wafer inspection region is performed by setting an area of the desired wafer inspection region to be smaller than an area of a wafer measurement region.

6. The method as claimed in claim 1, wherein extracting the spectral cube includes extracting from the spectral cube a spectrum representing variation of reflectivity or phase according to wavelength in each pixel in the desired wafer inspection region.

7. The method as claimed in claim 1, wherein performing the fabricating process includes forming patterns on the wafer, a profile of the patterns or defects of the patterns being examined by the inspecting of the desired wafer inspection region.

8. The method as claimed in claim 1, wherein performing the fabricating process includes forming a material layer on the wafer, a thickness or a physical property of the material layer being examined by the inspecting of the desired wafer inspection region.

9. A method of inspecting a wafer, the method comprising:
performing a fabricating process on a wafer;
irradiating broadband light once on a measurement region of the wafer, such that the light is reflected from the wafer;
generating a spectral cube using the light reflected from the measurement region of the wafer;
storing the spectral cube in a computer;
extracting from the spectral cube a spectrum of a desired wafer inspection region of a product of the fabricating process by using the computer in which the spectral cube is stored; and
inspecting the desired wafer inspection region by analyzing the spectrum extracted by the computer using a spectrum of the desired wafer inspection region, which is included in a spectrum recognition algorithm.

10. The method as claimed in claim 9, wherein generating and storing the spectral cube in the computer includes:
making the light reflected from the wafer measurement region incident on a spectral imaging camera;
generating a spectrum representing variation of reflectivity or phase in each pixel via an optical sensor in the spectral imaging camera; and
storing the spectral cube representing the variation of the reflectivity or the phase according to wavelength in each of the pixels in the computer.

11. The method as claimed in claim 9, further comprising selecting the desired wafer inspection region in the spectral cube using the computer in which the spectral cube is stored, before extracting the spectrum of the desired wafer inspection region.

12. The method as claimed in claim 9, wherein analyzing the extracted spectrum is performed using a spectrum analyzer including a spectrum recognition algorithm.

13. The method as claimed in claim 12, wherein inspecting the result of the fabricating process on the desired wafer inspection region includes comparing the spectrum of the desired wafer inspection region, and the extracted spectrum of the desired wafer inspection region.

14. The method as claimed in claim 13, wherein the fabricating process includes forming a pattern on the wafer or forming a material layer on the wafer.

15. The method as claimed in claim 14, wherein inspecting the result of the fabricating process includes checking a profile or defects of the pattern, or a thickness or a physical property of the material layer.

16. A method of inspecting a wafer, the method comprising:
performing a fabricating process on a wafer;
irradiating light on a desired wafer inspection region of a product of the fabricating process, such that the light simultaneously irradiates an entirety of the desired wafer inspection region, the light being incident simultaneously on multiple points;
generating a spectral cube using light reflected from the desired wafer inspection region;
extracting from the spectral cube a spectrum of at least a portion of the desired wafer inspection region; and
inspecting the desired wafer inspection region by analyzing the extracted spectrum.

17. The method as claimed in claim 16, wherein irradiating light on the desired wafer inspection region includes using a single imaging operation to irradiate the entirety of the desired wafer inspection region.

18. The method as claimed in claim 16, wherein simultaneously irradiating the entirety of the desired wafer inspection region includes adjusting the light to be incident simultaneously on multiple points, such that each image in the spectral cube includes a plurality of pixels.

19. The method as claimed in claim 18, wherein simultaneously irradiating the entirety of the desired wafer inspection region includes adjusting a light source irradiating the light to be stationary, such that an incidence angle of the light on the desired wafer inspection region is constant until generation of the spectral cube is complete.

20. The method as claimed in claim 16, wherein generating the spectral cube includes generating a plurality of images, each image of the plurality of images being an image of the same entire desired wafer inspection region.

* * * * *